Patented July 3, 1945

2,379,486

UNITED STATES PATENT OFFICE 2,379,486

ACIDYL BIURETS

Arthur J. Hill, New Haven, Conn., and William M. Degnan, Bloomington, Ind., assignors to American Cyanamid Company, New York, N. Y., a corporation of Maine No Drawing. Application May 28, 1941, Serial No. 395,624

5 Claims. (Cl. 260—553)

This invention relates to acidyl biurets having the general formula: R—CO—B in which B is a biuret radical, the bond being to a terminal nitrogen, and R—CO— represents a substituted-acetyl group in which R represents either a branched chain alkyl radical having at least three carbon atoms or an alkyl substituted alkyl radical. The invention contemplates both a process whereby many of these compounds can be prepared for the first time and the compounds so prepared.

As used in the present invention, the expressions "a biuret" and "a biuret radical" are intended to include not only the unsubstituted radical,

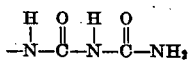

but also the 5- and/or 5,5-alkyl, acetyl and aracetyl biurets and biurets in which the 5,5- substituents form with the nitrogen a heterocyclic ring such as 5,5-cyclopentamethylene biuret. The process is also applicable to the thiobiurets, permitting the preparation of a series of analogous acidyl thiobiurets.

According to the present invention the acidyl biurets capable of representation by the general formula R—CO—B in which R represents an alkyl radical having three or more carbon atoms are found to include many members which have a remarkable hypnotic and sedative effect. The size and structure of that part of the acidyl group represented in the general formula by R— has an important bearing on the hypnotic properties of the compound. Where R represents an alkyl radical containing one or two carbon atoms, as for example, when R—CO— represents an unsubstituted acetyl group, no hypnotic properties are observed.

Further, branched chains are more effective than straight chains. For example, where R represents an alkyl radical of three carbon atoms, the isopropyl grouping produces some hypnotic activity in the resultant acidyl biuret whereas the n-propyl grouping does not. Excellent hypnotics and sedatives can be prepared from compounds in which R represents the five carbon atom, diethylmethyl group. In order to obtain comparable effects with a straight chain it must have a materially higher molecular weight than in the case of the branched chain. For this reason, the branched chain compounds are preferred although the invention is not broadly limited to these compounds.

Acetyl biuret, itself, is a known compound which can be prepared by direct acylation of biuret with the acid chloride. With most biurets, however, this reaction either may not be carried out at all or only with a very slight degree of success. The present invention comprises a novel process whereby many new compounds may be readily prepared in good yield. By making use of the novel procedure of the present invention, a number of new compounds were prepared including the acidyl biurets of the type capable of representation by the formula R—CO—B in which R and B have the meaning set forth above.

In general the process of the present invention comprises reacting a suitable alkylacyl isocyanate with urea, substituted ureas, and thioureas, in ether or benzene suspension. The reaction products were purified by dissolution and crystallization or reprecipitation to yield products having a sharp melting point. Yields as high as 83% of the theoretical were obtained.

The invention will be described in conjunction with the following experimental data:

PREPARATION OF ALKYLACYL CHLORIDES

A number of substituted acetic acids were prepared according to the method of Levene and Cretcher (J. Biol. Chem. 35, 505, (1918). These were converted to the corresponding chlorides by allowing the di-substituted acid to stand with a 100% excess of thionyl chloride for about 12 hours. The resultant product was refluxed to complete the reaction and the acid chlorides so obtained were purified by distillation through a packed column under vacuum.

PREPARATION OF ALKYLACYL ISOCYANATES

The appropriate acid chloride was dissolved in five volumes of carefully dried diethyl ether and added slowly during stirring to a slight excess of freshly prepared silver cyanate suspended in dry ether. A round-bottomed flask fitted with a sealed stirrer and a reflux condenser carrying a calcium chloride tube was found to be convenient as a reaction vessel. In every case reaction commenced spontaneously and was completed by refluxing the reaction mixture gently for one to three hours. The suspension was then quickly filtered through a Büchner funnel to remove the silver chloride, and the ether was removed from the filtrate in the usual manner. The residue was then distilled under vacuum. Table 1 lists a number of representative acyl isocyanates prepared by the above process.

Table 1

| Acyl isocyanate | Boiling point, °C. | Yield Per cent |
|---|---|---|
| n-Butylethylacetyl | 78–85° at 20 mm | 81 |
| s-Butylethylacetyl | 55–56° at 11 mm | 59 |
| Isoamylethylacetyl | 100–105° at 30 mm | 82 |
| Dibutylacetyl | 68–73° at 12 mm | 74 |
| Phenylethylacetyl | 111–115° at 11 mm | 42 |
| Allylethylacetyl | 83–85° at 34 mm | 65 |
| Ethyldimethylacetyl | 65–70° at 10 mm | 70 |

By reason of the high reactivity of acyl isocyanates with atmospheric moisture, direct analysis of these compounds was impracticable. They were characterized through their derivatives with urea.

Substituted Ureas

Monoethyl and diethyl urea were prepared by the nitrourea dearrangement method of Davis and Blanchard (J. A. C. S. 51, 1797 (1929). Other ureas were prepared by the conventional treatment of the amine hydrochlorides with potassium cyanate.

Preparation of Alkylacyl Biurets

These compounds were prepared by the reaction of the appropriate isocyanate with urea or a substituted urea in diethyl ether or petroleum ether. The general technique employed was as follows: the urea was suspended (or dissolved where soluble) in dry ether or petroleum ether in an Erlenmeyer flask. Slightly less than one equivalent of the acyl isocyanate dissolved in dry ether was then added quickly. A reflux condenser carrying a calcium chloride tube was attached to the flask and the suspension (or solution) was refluxed gently until the characteristic odor of the isocyanate had disappeared. The heating time varied from three to forty-eight hours. When reaction was complete the suspension (or solution) was cooled and filtered if the product appeared only slightly soluble in cold ether, or the ether was removed by distillation if the product appeared appreciably soluble. The residue was then crystallized from hot water, hot alcohol, or hot dilute alcohol. Two recrystallizations usually sufficed.

Preparation of Alkylacyl Thiobiurets

It was found that the dialkylacetyl isocyanates reacted slowly or not at all with thiourea at the temperature of boiling ether, so reactions in this series were carried out in boiling benzene. Thiourea was suspended in dry benzene and exactly one equivalent of the isocyanate was added. The suspension was heated for twelve hours, during which time the thiourea disappeared and a clear yellow solution with a characteristic unpleasant odor was formed. This was cooled in an icebath to precipitate a jelly-like material which was filtered off. The acidyl thiobiurets were purified by dissolution in cold alcohol, followed by precipitation by the addition of an equal volume of cold water. Several repetitions of this operation gave products which melted sharply. The acyl thiobiurets were obtained as slightly yellow amorphous powders with marked pyroelectric properties. Yields in this series were low, due primarily to handling losses during purification.

Table 2 lists a number of representative acyl-biurets prepared in accordance with the above-described process.

Table 2

| Biuret | Yield, Per cent | Melting point, °C. | Nitrogen Per cent calcd. | Nitrogen Per cent found |
|---|---|---|---|---|
| Diethylacetyl | 70 | 178 | 20.89 | 20.89 |
| n-Butylethylacetyl | 52 | 106 | 18.34 | 18.24 |
| s-Butylethylacetyl | | 89 | 18.34 | 18.19 |
| Isoamylethylacetyl | 34 | 177 | 17.35 | 17.21 |
| Dibutylacetyl | 61 | 158 | 16.34 | 16.21 |
| Phenylethylacetyl | 83 | 154 | 16.83 | 16.90 |
| Allylethylacetyl | | 106 | 19.71 | 19.56 |
| Ethyldimethylacetyl | | 171 | 20.89 | 20.95 |
| 1-diethylacetyl-5-ethyl | | 245 | 18.34 | 18.30 |
| 1-diethylacetyl-5, 5-diethyl | 20 | 104 | 16.34 | 16.39 |
| 1-diethylacetyl-5-p-phenacetyl | 79 | 127 | 14.14 | 14.20 |
| 1-diethylacetyl-5, 5-cyclopentamethylene | | 113 | 15.61 | 15.68 |
| Ethylene-bis-diethylacetyl [1] | 66 | 246 | 19.55 | 19.65 |
| 1-diethylacetyl-4-thio | | 132 | 19.20 | 19.35 |
| 1-isoamylethylacetyl-4-thio | | 123 | 16.22 | 16.36 |
| 1-allylethylacetyl-4-thio | | 123 | 18.34 | 18.40 |

[1] Crystallized from glacial acetic acid.

In the process described above for the preparation of the alkylacyl isocyanates, various other branched-chain alkylacetyl chlorides may be employed. Similarly, other carboxylic acid residues such as the propionyl or butyryl radicals may be incorporated in the alkylacyl group by making use of the appropriate alkylacyl chloride. In such a case the alkyl substituents may be on the $\alpha$, $\beta$ or $\gamma$ position, as for example in $\alpha$-dimethybutyryl chloride. The resultant isocyanate may then be converted to the corresponding acidyl biuret according the procedure outlined above.

When the group represented by R is a di-substituted alkyl radical, either or both substituents may be a saturated or an unsaturated alkyl group as for example in allylethylacetyl chloride. Either or both substituents may be an aryl radical. R may also represent an aralkyl group such as phenylethyl or the like. If so desired, the size of the molecule may be further enlarged by a double substitution which may be represented by the type formula: B—CO—R—CO—B in which R and B have the same meaning set forth above. An example of such a compound is ethylene-bis-diethylacetyl-4-thiobiuret.

We claim:

1. Acidyl biurets of the general formula

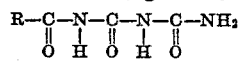

in which R represents a radical selected from the group consisting of the branched chain alkyl radicals of at least three carbon atoms and alkyl di-substituted alkyl radicals in which one of the alkyl substituents is unsaturated.

2. Acidyl biurets of the general formula

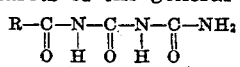

in which R represents a branched chain alkyl radical of at least three carbon atoms.

3. Diethylacetyl biuret.
4. Dibutylacetyl biuret.
5. n-Butylethylacetyl biuret.

ARTHUR J. HILL.
WILLIAM M. DEGNAN.